April 14, 1953     W. L. ZINK     2,634,517
EARTH SCRAPER APPARATUS
Filed Feb. 19, 1948     2 SHEETS—SHEET 1
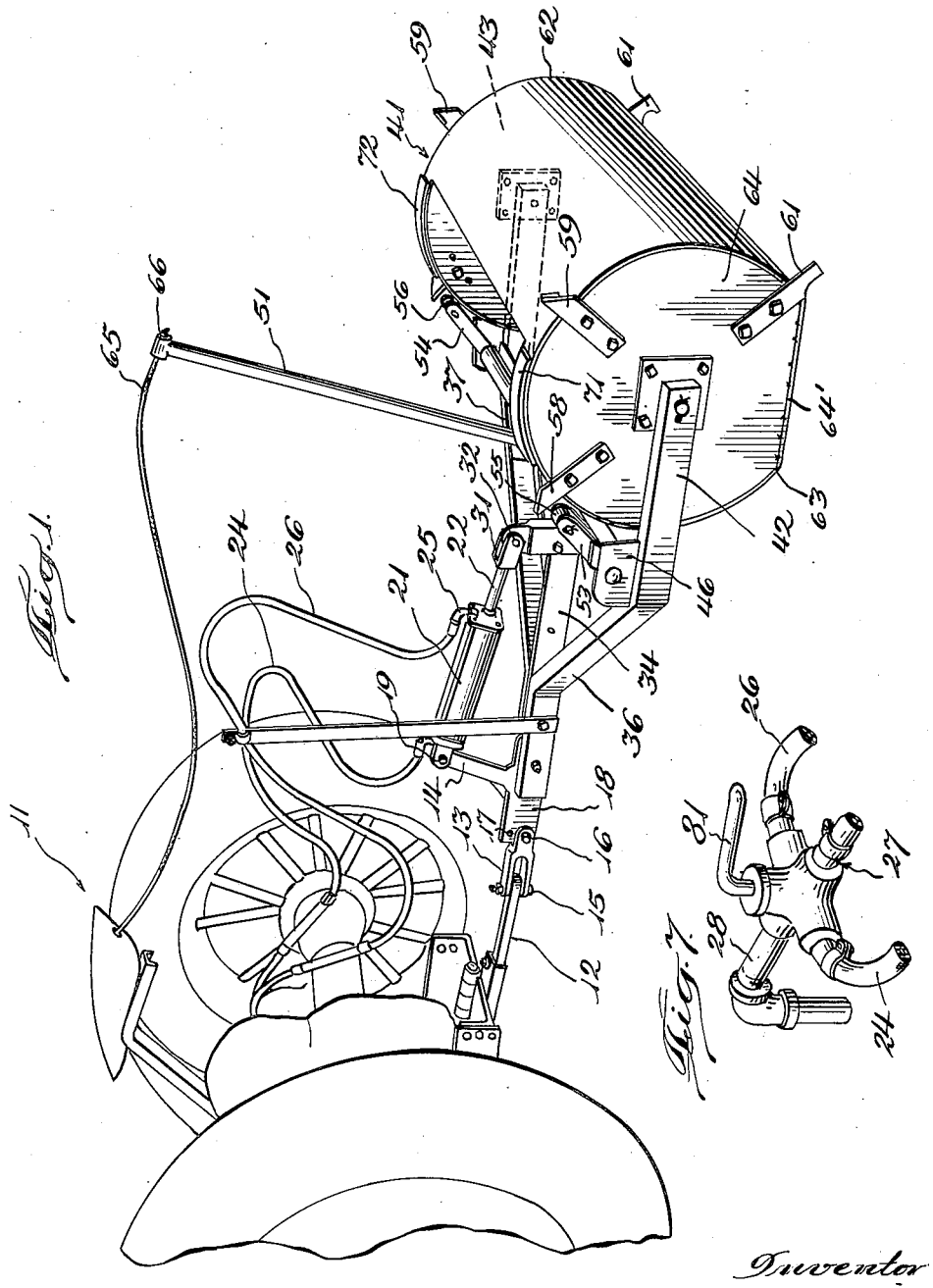
Inventor
William L. Zink
By Bellows &
Frank H. Marks
attorneys

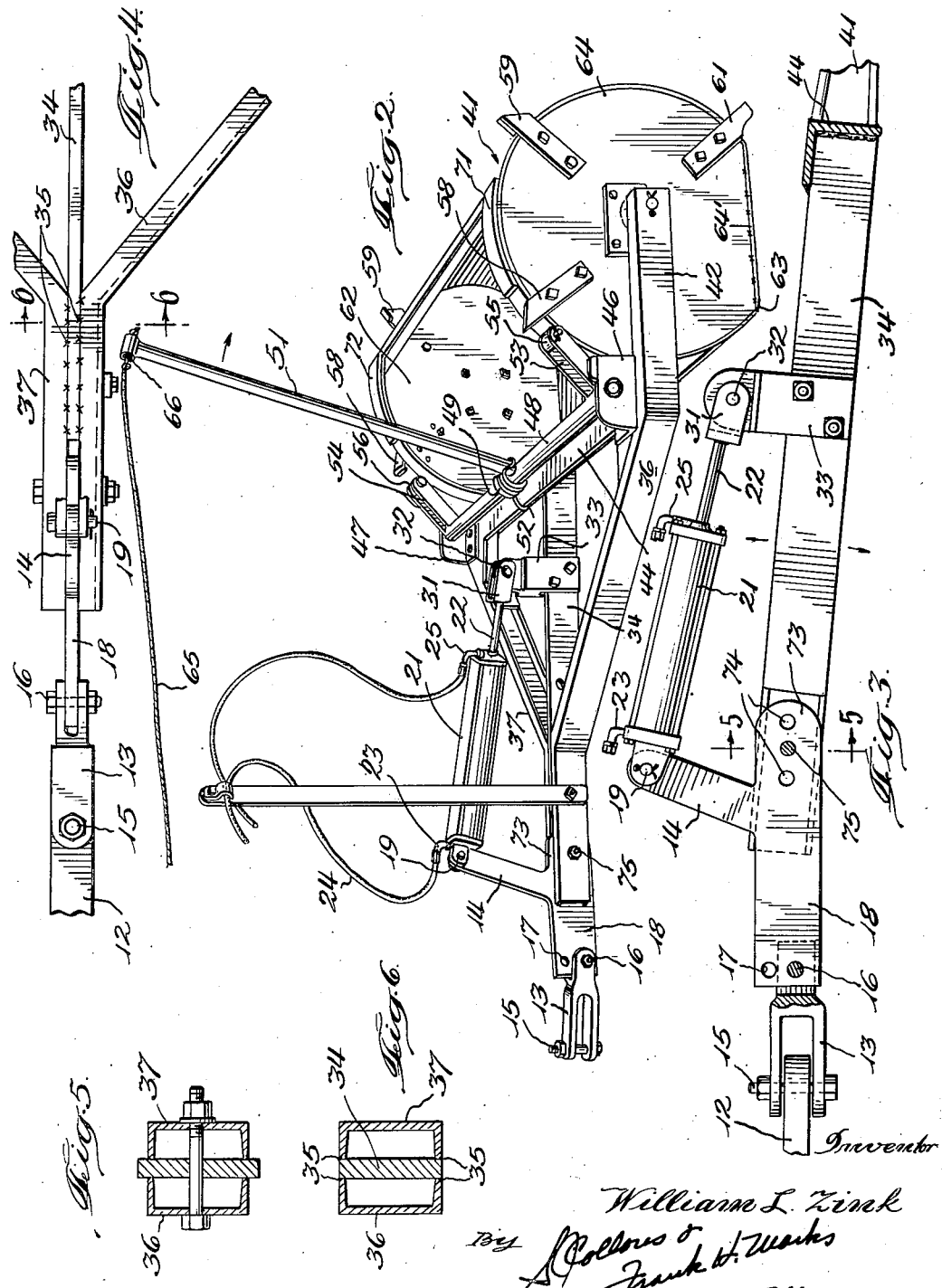

Patented Apr. 14, 1953

2,634,517

UNITED STATES PATENT OFFICE 2,634,517

EARTH SCRAPER APPARATUS

William L. Zink, Plano, Ill., assignor to Sears, Roebuck and Co., Chicago, Ill., a corporation of New York Application February 19, 1948, Serial No. 9,448

1 Claim. (Cl. 37—140)

The present invention relates to earth scraper apparatus and is concerned more particularly with traction coupling and control mechanism whereby adjustment operations and supervision may be regulated from the driver's position on the seat of a traction vehicle.

The present improvement has particular application to a type of earth scraper which is substantially cylindrical in shape and is journaled in oppositely extending trunnion pins or pintles in the approximate longitudinally axial center of the scraper unit. The scraper is held in a yoke and is designed to be secured in each of several axially rotatable positions on its trunnions. But for its rotational arrestment device or latching means the scraper is permitted to roll as it is being pulled forward by the traction implement and the device for arresting its rotation is designed to be interposed variously so as to thereby condition said scraper for its earth scraping, earth dumping, or simply its non-active operations. Also means are provided for changing the angularity of its effective earth scraping position so that the biting edge of its scraper blade may be made to engage the soil's surface variously so as to produce optionally a sharp digging-in effect, a shallow surface soil removing effect, or intermediate adjustments in accordance with particular requirements and conditions of soil.

While these and other earth scraper regulating supervisions have been provided heretofore, it is a principal object of the present invention to utilize more completely the facilities of a gasoline driven traction device such as conventional combustion engine farm tractors in the dual capacity of drawing scraper traction implements as well as to operate with its rotary power surplus a fluid compression gear pump which regulates the position of a hydraulic piston actuator, whereby there is, with a minimum of physical effort, instantly and critically adjusted the angular position of the earth scraper blade.

Another object of the present invention is to provide a hydraulic scraper hitch or coupling device which may be quickly and conveniently connected and disconnected so as to enable the traction implement to be placed into service or released therefrom with a minimum of time consumption and physical effort.

With the foregoing and other objects of the present invention in view reference will now be had to the accompanying drawings and to the following detailed description in which similar reference characters designate corresponding parts throughout and in which:

Fig. 1 is a perspective view of the rear end of a typical farm tractor having an earth scraper coupled thereto by means of a hitch embodying certain features characteristic of the present invention, Fig. 2 is a detailed perspective view of the same earth scraper and hitch mechanism uncoupled from the tractor illustrating the control apparatus in the position of use, Fig. 3 is a transverse side elevational view illustrating the hydraulic operating cylinder and its related mechanical function levers, Fig. 4 is a fragmentary plan view of the apparatus featured in Fig. 3, Fig. 5 is a transverse sectional view taken approximately on line 5—5 of Fig. 3, Fig. 6 is a transverse detailed sectional view taken approximately on line 6—6 of Fig. 4, and Fig. 7 is a detailed perspective view of a control valve mechanism such as may be employed for regulating the admission of operating fluid to the hydraulic piston housing featured in Figs. 1 and 2.

Having particular reference now to the accompanying drawings, attention is directed to the reference numeral 11 which designates generally a four wheeled power traction vehicle of a type now widely recognized for its utility in drawing various types of farm implements and characterized by its provision of a traction coupling tongue 12 or draw bar to which is secured by means of a clevis hook 13 the angle regulating lever 14. The clevis hook is pivoted on a vertical axis as afforded by bolt 15 and on a horizontal axis as afforded by bolt 16, the latter being insertable in any of several holes 17 carried in the forward arm 18 of lever 14.

Thus there is provided a limited vertical and horizontal yieldability through the clevis connection between the drawbar 12 and lever 14 which is the initial component in the integrated hitch or scraper apparatus now to be described. The upright arm of lever 14 is pivotally articulated as at 19 to the housing structure 21 of the hydraulic piston. At the opposite of the end of the piston case there projects the piston rod 22 integrally associated with a piston head (not shown) contained within the case 21. At 23 there is connected to the cylinder chamber of piston case 21 a flexible hose 24 which supplies fluid under pressure to the piston projecting side of the case 21 while at 25 there is connected to the piston case 21 a flexible fluid conveying hose 26 for supplying operating fluid to the piston retracting side.

Flexible hose conduits 24 and 26 suitable for the communication of fluid under hydraulic pressures may be connected to a single lever-control regulating valve 27 of a type which directs fluid from a compression source 28 to either one of the flexible conduits 24 or 26 and when so regulated the other of the flexible conduits 24 or 26 serves as a return avenue for the fluid which is being driven back by the direction of movement of the piston within the case 21.

At the end of the piston rod 21 there is provided a yoke coupling 31 which is pivotally articulated as at 32 to an upstanding arm 33 integrally associated with a central beam 34, see also Fig. 6, which forms a part of the channel-iron truss assembly and traction yoke to be more particularly described hereinafter. Beam 34 may be welded as at 35 to the top and bottom flanges of the channel elements 36 and 37. These are symmetrically similar and opposite as best indicated in Figs. 2 and 4, flaring outwardly thence parallelly in spaced relation to straddle the extremity of the bucket scraper generally designated 41. The parallel extremities of the yoke indicated 42 and 43 are rigidified by a transverse angle iron truss 44 which may be welded or riveted at its extremities to the channel members and carries thereat the pivot brackets 46 and 47 as best indicated in Fig. 2.

Aligned journal holes are provided in the pivot brackets 46 and 47 through which protrude pintle extremities of a rotatable operating bail 48, spring loaded in a clockwise direction as viewed in Figs. 1 and 2 by a coiled torque spring 49 one end of which encircles operating arm 51 and the other end of which is hooked as at 52 around the horizontal flange of the angle bar 44.

Near each of its opposite ends the operating bar 48 is provided with integrally associated locking arms 53 and 54 which carry interposition rollers 55 and 56 transversely spaced so as to lie in the path of the several blocking lugs 58, 59 and 61, respectively.

It will be observed that blocking lugs 58, are disposed on opposite sides 64 and 62 of the bucket scraper 41 in such position that when engaging the interposition rollers 55 and 56 the bucket scraper is disposed as to present the scraper edge 63 of its bucket floor 64' into biting engagement with the soil upon which the scraper drags. When the operating bail 48 is rotated against the influence of its return spring 49 by the pulling of control cord 65 which is attached as at 66 to the top of the control arm 51, Figs. 1 and 2, lugs 58 will be permitted to clear the blocking assembly, comprised of the rollers 55 and 56 and thereafter when released, the blocking rollers 55 and 56 will interpose themselves into the path of the oncoming lugs 59. Under this condition of arrestment the scraper bucket 41 will have rotated approximately 90 degrees and will be disposed to dump its accumulated contents, the scraper edge 63 of the bucket floor 64' being then sufficiently high to clear the discharged scraper accumulations.

Thereafter, upon a further actuation of the control cord 65 and momentary retraction of the interposition rollers 55 and 56 the scraper bucket will be permitted to rotate an additional 90 degrees or until the interposition lugs 61 engage the rollers 55 and 56. This condition is at 180 degrees' variance from the condition illustrated in Figs. 1 and 2 and under such circumstances the bucket scrapers will be permitted to glide on its skid plates 71 and 72. When so disposed, it is to be understood that the projections of lugs 58 and 59 are sufficiently short to clear the ground surface so as not to interfere with the free movement of the bucket scraper on its skid plates. Calling particular attention now to Figs. 1 and 2 reference will again be had to the regulating lever 14 and to its third significant arm 73 which is provided as indicated in Fig. 3 with the plurality of transverse openings 74 through which there may be passed the pivotal traction bolt 75. The adjustment afforded by the holes 74 is provided in order to regulate the relative position of lever 14 subject to its pivotal disposition under the control of the piston within housing 21.

It will be observed that by varying the combined length of piston housing 21 and its piston rod 22, in accordance with the regulation of control valve arm 81, Fig. 7, there will be determined the relative disposition of pivot 19 with respect to fixed pivots 75 and 32, see Fig. 3.

Since the traction bar 12 is of fixed height as controlled by its securement to the traction implement lever the aforedescribed relative rotation of lever 14 will result in the movement of lever 14 about its pivot 16 as a center and the consequent raising or lowering of the pivot 75. This movement although marginal in accordance with the protrusion or retraction of piston rod 22 will afford an accurate means of disposing the biting edge 63 of the bucket floor 64' and will thereby regulate the amount of earth removed as the traction implement 11 and the bucket scraper 41 are moved forwardly.

By locating the pivot bolt 75 in one of the other holes 74 of arms 73 a coarse adjustment may be established but within the ranges afforded under each pivotal association. As a result of the aforedescribed means of regulating the biting angle of bucket floor 64' there is provided a mechanism which can be conveniently and easily supervised by the tractor attendant without having to exert material physical force and also without having to interrupt his attention from guiding the traction implement beyond that required in operating the valve regulating lever arm 81, Fig. 7. In this way the scraper implement 41 may be employed in achieving surface smoothing and grading operations over a large area and in producing earth removal operations.

While the present invention has been explained and described with reference to a more or less particular embodiment or structural design it is to be understood nevertheless that numerous variations and modifications may be incorporated without departing from the essential spirit or scope thereof. It is accordingly not intended to be limited by the particular disclosure employed in the foregoing detailed specification except as indicated in the hereunto appended claim.

The invention claimed is:

A roll-over scraper implement for motor driven tractor vehicles comprising, a cylindrical scraper bucket having substantially circular end walls, trunnion studs extending outwardly of said end walls, a traction yoke having parallel extremities which afford journals to said studs, pivot brackets carried on said yoke, a transverse operating bail journalled in said pivot brackets, a pair of abutment arms integral with said bail, each arm being disposed in planar alignment with one of said scraper bucket end walls, a plurality of pairs of blocking lugs secured in opposite alignment at predetermined angular positions on said end walls so as to encounter pair by pair said operating bail abutment arms at different circumferential positions of said scraper bucket in correspondence with its scraping, spreading, and idle travel positions, a coupling clevis at the front of said yoke, a three-armed link of which one arm is horizontally pivoted to said clevis, another horizontally pivoted to said yoke and a third is upstanding, and means comprising an hydraulically expandable link connecting said upstanding arm with a fixture bracket on said yoke for thereby adjustably determining the relative elevation of said coupling clevis and for regulating the angle at which the tractor vehicle pulls said yoke.

WILLIAM L. ZINK.

References Cited in the file of this patent

UNITED STATES PATENTS

| Number | Name | Date |
| --- | --- | --- |
| 1,852,062 | Reynolds | Apr. 5, 1932 |
| 1,924,360 | Harrison | Aug. 29, 1933 |
| 1,965,364 | Bird | July 3, 1934 |
| 2,063,698 | Roe | Dec. 8, 1936 |
| 2,158,340 | Spieth | May 16, 1939 |